(12) United States Patent
Walster et al.

(10) Patent No.: US 7,296,047 B1
(45) Date of Patent: Nov. 13, 2007

(54) METHOD AND APPARATUS FOR SOLVING OVERDETERMINED SYSTEMS OF INTERVAL LINEAR EQUATIONS

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 700 days.

(21) Appl. No.: 10/447,371

(22) Filed: May 28, 2003

Related U.S. Application Data

(60) Provisional application No. 60/383,542, filed on May 28, 2002.

(51) Int. Cl.
*G06F 17/12* (2006.01)
(52) U.S. Cl. .................................. 708/446
(58) Field of Classification Search .............. 708/446
See application file for complete search history.

(56) References Cited

U.S. PATENT DOCUMENTS

| | | | | |
|---|---|---|---|---|
| 6,859,817 | B2* | 2/2005 | Walster et al. | 708/446 |
| 6,915,321 | B2* | 7/2005 | Walster et al. | 708/446 |
| 6,920,472 | B2* | 7/2005 | Walster et al. | 708/446 |
| 6,950,844 | B2* | 9/2005 | Walster et al. | 708/446 |
| 6,993,548 | B2* | 1/2006 | Walster et al. | 708/446 |
| 2003/0105789 | A1* | 6/2003 | Walster et al. | 708/446 |
| 2003/0110195 | A1* | 6/2003 | Walster et al. | 708/446 |
| 2004/0015531 | A1* | 1/2004 | Walster et al. | 708/446 |

OTHER PUBLICATIONS

E.R. Hansen, "Global Optimization Using Interval Analysis," Marcel Dekker, Inc., New York, NY, 1992.

(Continued)

*Primary Examiner*—D. H. Malzahn
(74) *Attorney, Agent, or Firm*—Park, Vaughan & Fleming, LLP

(57) ABSTRACT

One embodiment of the present invention provides a system that solves an overdetermined system of interval linear equations. During operation, the system receives a representation of the overdetermined system of interval linear equations Ax=b, wherein A is a matrix with m rows corresponding to m equations, and n columns corresponding to n variables, and wherein x includes n variable components, b includes m scalar components, and m>n. Next, the system performs a Gaussian Elimination operation to transform Ax=b into the form $$\begin{bmatrix} T \\ W \end{bmatrix} x = \begin{bmatrix} u \\ v \end{bmatrix},$$

wherein T is a square upper triangular matrix of order n, u is a vector with n components, v is a vector with m−n components, and W is a matrix with m−n rows and n columns, wherein W is zero except in the last column, which is represented as a column vector z with m−n components. Next, the system performs an interval intersection operation based on the equations $z_i x_n = v_i$ (i=1, ..., m−n) and $T_{nn} x_n = u_n$ to solve for $x_n$. If $x_n$ is not the empty interval, the system performs a back substitution operation using $x_n$ and Tx=u to solve for the remaining components $(x_{n-1}, ..., x_1)$ of x.

8 Claims, 5 Drawing Sheets

OTHER PUBLICATIONS

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152-147. http:///www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math Software, 20, vol. 4, Dec. 1994, pp. 447-458.

R. B. Kearfott and G.W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Euqations," Cambridge University Press, Cambridge, 1990, ISBN: 0-12-505630-3, Reliabiliy in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

Pascal Van Hentenryck, Vijay Saraswat and Yves Deville, "Design, Implementation, and Evaluation of the Constraint Language cc (FD)," Elsevier Science, Inc., 1998.

* cited by examiner $$X \equiv [\underline{x}, \bar{x}] = \{x \in \Re^* | \underline{x} \leq x \leq \bar{x}\}$$

$$Y \equiv [\underline{y}, \bar{y}] = \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times y, \bar{x} \times y, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\bar{y}, \bar{x}/\underline{y}), \max(\uparrow \underline{x}/\underline{y}, \underline{x}/\bar{y}, \bar{x}/\underline{y}, \bar{x}/\bar{y})], \text{ if } 0 \notin Y$ $X/Y \subseteq \Re^*, \text{ if } 0 \in Y$

METHOD AND APPARATUS FOR SOLVING OVERDETERMINED SYSTEMS OF INTERVAL LINEAR EQUATIONS

RELATED APPLICATIONS

This application hereby claims priority under 35 U.S.C. §119 to U.S. Provisional Patent Application No. 60/383,542, filed on 28 May 2002, entitled "Solving Overdetermined Systems of Interval Linear Equations," by inventor G. William Walster.

BACKGROUND

1. Field of the Invention

The present invention relates to techniques for performing arithmetic operations involving interval operands within a computer system. More specifically, the present invention relates to a method and an apparatus for solving overdetermined systems of interval linear equations within a computer system.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Also note that the infimum and the supremum can be represented by floating point numbers.)

One commonly performed computational operation is to solve a system of linear equations Ax=b, wherein A is an (n×n) matrix and b is a (n×1) column vector. Such a system is said to be "consistent" if there is a unique (n×1) vector x for which the system Ax=b is satisfied. In many cases, a system of linear equations is "overdetermined," which means that there are more equations than unknowns. In an overdetermined system Ax=b, the number of rows in A and elements in b is m, which is greater than n (the number of columns in A and elements in x).

In the point (non-interval) case, there is no generally reliable way to decide if an overdetermined system is consistent or not. Instead a least squares solution is generally sought. However, in an overdetermined system of linear equations with interval coefficients, the additional equations can potentially help in bounding the set of solutions.

Hence, what is needed is a method and an apparatus for solving an overdetermined system of interval linear equations.

SUMMARY

One embodiment of the present invention provides a system that solves an overdetermined system of interval linear equations. During operation, the system receives a representation of the overdetermined system of interval linear equations Ax=b, wherein A is a matrix with m rows corresponding to m equations, and n columns corresponding to n variables, and wherein x includes n variable components, b includes m scalar components, and m>n. Next, the system performs a Gaussian Elimination operation to transform Ax=b into the form $$\begin{bmatrix} T \\ W \end{bmatrix} x = \begin{bmatrix} u \\ v \end{bmatrix},$$

wherein T is a square upper triangular matrix of order n, u is an interval vector with n components, v is an interval vector with m-n components, and W is a matrix with m-n rows and n columns, wherein W is zero except in the last column, which is represented as a column vector z with m-n components. Next, the system performs an interval intersection operation based on the equations $z_i x_n = v_i$ (i=1, ..., m-n) and $T_{nn} x_n = u_n$ to solve for $$x_n = \frac{u_n}{T_{nn}} \bigcap_{i=1}^{m-n} \frac{v_i}{z_i}.$$

If $x_n$ is not the empty interval, the system also performs a back substitution operation using $x_n$ and Tx=u to solve for the remaining components $(x_{n-1}, \ldots, x_1)$ of x.

In a variation on this embodiment, before performing the Gaussian Elimination operation, the system uses a preconditioning matrix B to precondition the system of interval linear equations Ax=b to generate a modified system BAx=Bb that can be solved with reduced interval width.

In a further variation, the system generates the preconditioning matrix B by: (1) determining a non-interval matrix $A_c$, which is the approximate center of the interval matrix A; (2) augmenting the m by n matrix $A_c$ to produce an n×n partitioned matrix $$C = \begin{bmatrix} A'_c & 0 \\ A''_c & I \end{bmatrix},$$

wherein $A'_c$ is an n by n matrix, $A''_c$ is an m−n by n matrix, I is the identity matrix of order m−n, and 0 is an n by m−n matrix of zeros; and (3) calculating the approximate inverse of the partitioned matrix C to produce the preconditioning matrix B.

In a variation on this embodiment, the system linearizes an initial system of nonlinear equations to form the system of interval linear equations Ax=b.

In a variation on this embodiment, while performing the Gaussian Elimination operation, the system performs column interchanges in the system of interval linear equations Ax=b.

In a variation on this embodiment if $x_n$ is determined to be the empty interval during the interval intersection operation, the system indicates that the overdetermined system of interval linear equations Ax=b is inconsistent.

In a variation on this embodiment, if Ax=b is determined to be inconsistent, the system selects equations to remove from Ax=b to make a resulting system of equations consistent, and then removes the selected equations.

In a variation on this embodiment, if Ax=b is determined to be inconsistent, the system determines that at least one of the following is true: (1) a theory underlying Ax=b is false; (2) an error model underlying Ax=b is false; and (3) measurement error was involved in generating Ax=b.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs) and computer instruction signals embodied in a transmission medium (with or without a carrier wave upon which the signals are modulated). For example, the transmission medium may include a communications network such, as the Internet.

Computer System

Figure 1:
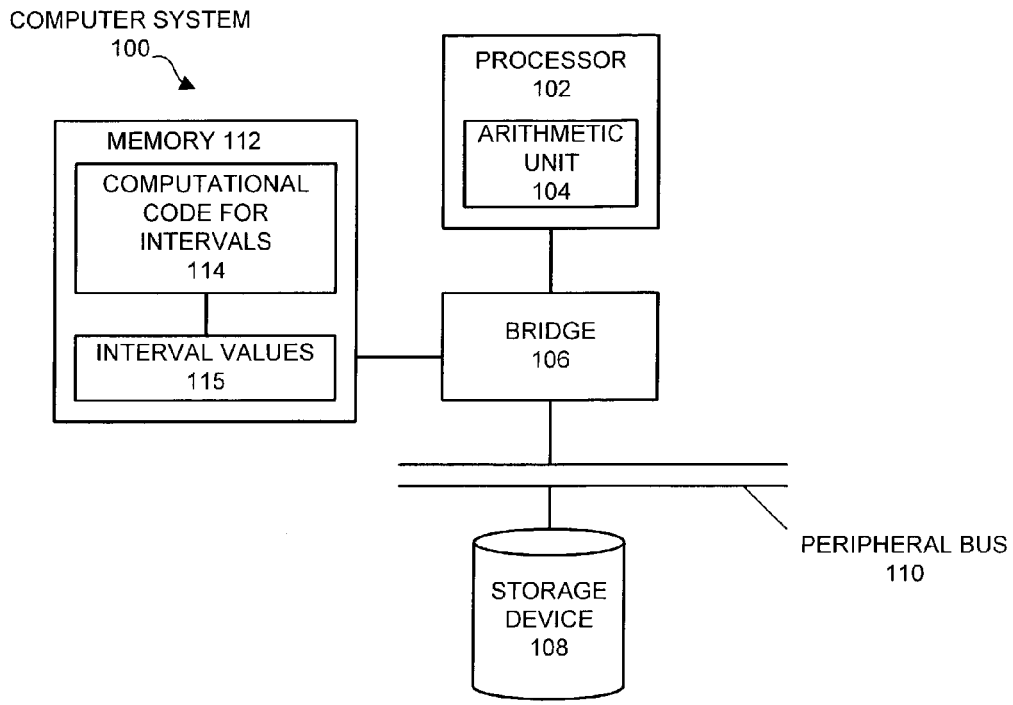
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2-5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
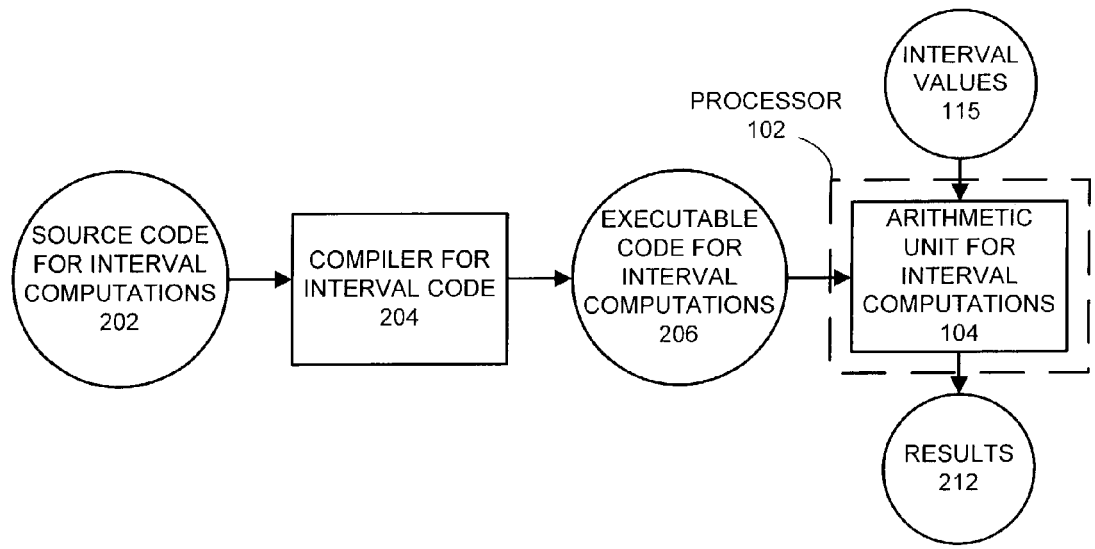
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
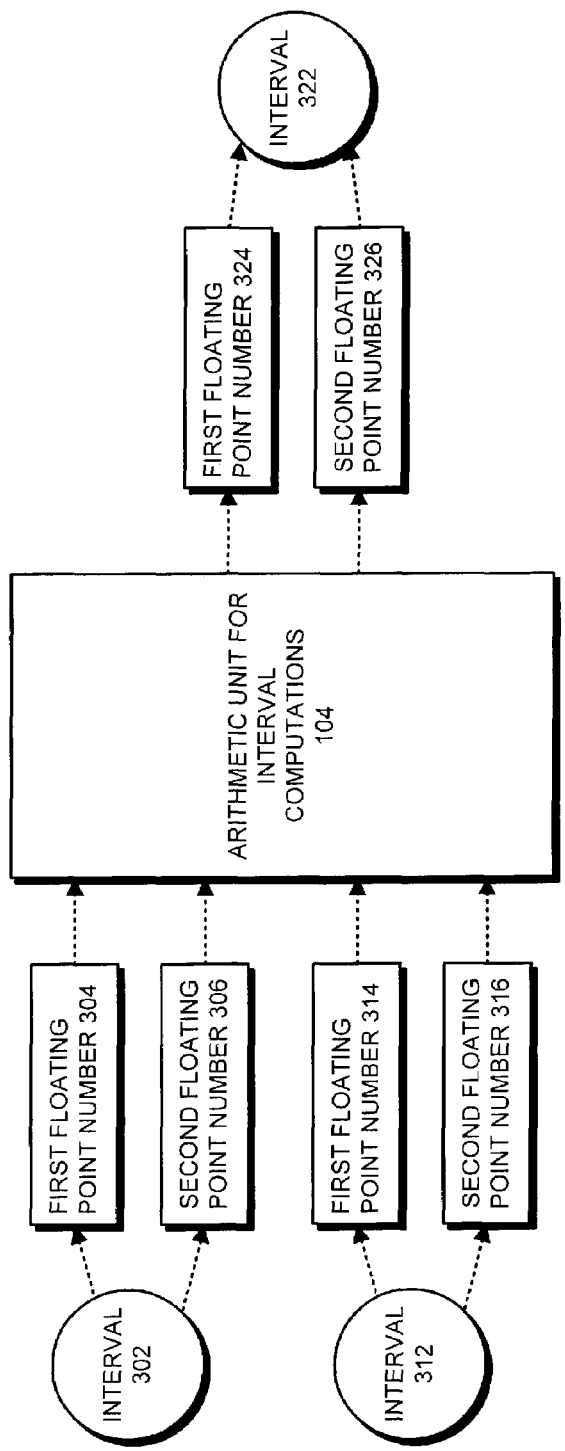
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
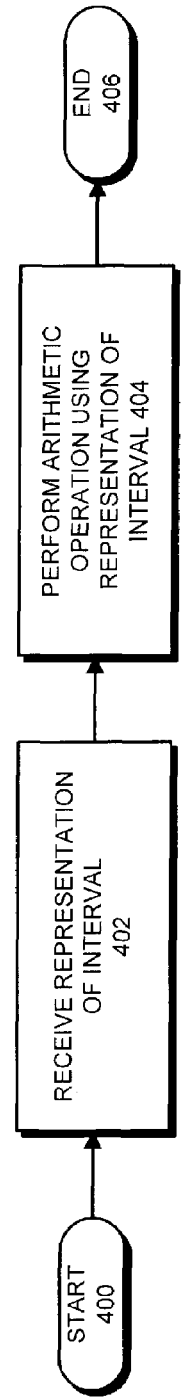
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) system of real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = (R \cup \{-\infty\}) \cup \{+\infty\} = [-\infty, +\infty].$$

We also define R** by replacing the unsigned zero, $\{0\}$, from R* with the interval $[-0,+0]$.

$$R^{**} = R^* - \{0\} \cup [-0,+0] = [-\infty, +\infty], \text{ because } 0 = [-0,+0].$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Solving an Overdetermined System of Interval Linear Equations

Given the real (n×n) matrix A and the (n×1) column vector b, the linear system of equations $$Ax = b \tag{1}$$

is consistent if there is a unique (n×1) vector x for which the system in (1) is satisfied. If the number of rows in A and elements in b is m≠n, then the system is said to be either under- or overdetermined depending on whether m<n or n<m. In the overdetermined case, if m-n equations are not linearly dependent, there is no solution vector x that satisfies the system. In the underdetermined case there is no unique solution.

In the point (non-interval) case, there is no generally reliable way to decide if an overdetermined system is consistent or not. Instead a least squares solution is generally sought. In the interval case, it is possible to delete inconsistent cases and bound the set of solutions to the remaining consistent equations.

We now consider the problem of solving overdetermined systems of equations in which the coefficients are intervals. That is, we consider a system of the form $$A^I x = b^I \quad (2)$$

where $A^I$ is an interval matrix of m rows and n columns with m>n. The interval vector $b^I$ has m components. Such a system might arise directly or by linearizing an overdetermined system of nonlinear equations. (Note that within this specification and in the following claims, we sometimes drop the superscript "I" when referring the interval matrices or vectors.)

The solution set of (2) is the set of vectors x for which there exists a real matrix $A \in A^I$ and a real vector $b \in b^I$ such that (1) is satisfied. In general, the system in (2) is inconsistent if its solution set is empty. However, we assume that there exists at least one $A \in A^I$ and $b \in b^I$ such that (1) is inconsistent. Moreover, we also assume that the data in $A^I$ and $b^I$ are fallible. That is, there exists at least one $A \in A^I$ and $b \in b^I$ such that (1) is inconsistent. Our goal is to implicitly exclude at least some of these cases. For example, the redundancy resulting from the fact that there are more equations than variables might be deliberately introduced to sharpen the interval bound on the set of solutions to (2). In a following section, we show how this sharpening is accomplished.

We shall simplify the system using Gaussian elimination. In the point case, it is good practice to avoid forming normal equations from the original system. Instead, one performs elimination using normal operation matrices to triangularize the coefficient matrix. After this first phase, the normal equations of this simpler system can be formed and solved. Our procedure begins with a phase similar to the first phase just described. However, we do not quite complete the usual procedure. We have no motivation to use normal operations because we do not form the normal equations. This is just as well because interval normal matrices do not exist.

When using interval Gaussian elimination, it is generally necessary to precondition the system to avoid excessive widening of intervals due to dependence. In the following section, we show how preconditioning can be done in the present case where $A^I$ is not square.

Preconditioning

Preconditioning can be done in the same way it is done when $A^I$ is square. Let $A_c$ denote the center of the interval matrix $A^I$. Partition $A_c$ as $$A_c = \begin{bmatrix} A'_c \\ A''_c \end{bmatrix} \quad (3)$$

where $A_c'$ is an n by n matrix and $A_c''$ is an m−n by n matrix. Note that $A_c'$ need only be an approximation for the center of $A^I$. Define the partitioned matrix $$C = \begin{bmatrix} A'_c & 0 \\ A''_c & I \end{bmatrix} \quad (4)$$

where I denotes the identity matrix of order m−n, and the block denoted by 0 is an n×m−n matrix of zeros.

Define the preconditioning matrix B to be the approximate inverse of C, where $$B = \begin{bmatrix} (A'_c)^{-1} & 0 \\ A''_c (A'_c)^{-1} & I \end{bmatrix}.$$

To precondition (2) we multiply by B. We obtain $$M^I x = r^I \quad (5)$$

Where $M^I = BA^I$ is an m by n interval matrix and $r^I = Bb^I$ is an interval vector of m components. When computing $M^I$ and $r^I$, we use interval arithmetic to bound rounding errors.

Elimination

We now perform elimination. We apply an interval version of Gaussian elimination to the system $M^I x = r^I$ thereby transforming $M^I$ into almost (see below) upper trapezoidal form. We assume that this procedure only fails when all possible pivot elements contain zero. Note that after preconditioning, no pivot selection is performed during the elimination to obtain a result with the form $$\begin{bmatrix} T^I \\ W^I \end{bmatrix} x = \begin{bmatrix} u^I \\ v^I \end{bmatrix} \quad (6)$$

where $T^I$ is a square upper triangular interval matrix of order n, and both $u^I$ and $v^I$ are interval vectors of n and m−n components, respectively. The submatrix $W^I$ is a matrix of m−n rows and n columns. It is zero except in the last column. Therefore, we can represent it in the form $$W^I = [0 \, z^I]$$

where 0 denotes an m−n by n−1 block of zeros, and $z^I$ is a vector of m−n intervals. We now have a set of equations $$z_i x_n = v_i \, (i=1, \ldots, m-n). \quad (7)$$

Also, $$T_{nn} x_n = u_n \quad (8)$$

Therefore, the unknown value $x_n$ is contained in the interval $$x_n = \frac{u_n}{T_{nn}} \bigcap_{i=1}^{m-n} \frac{v_i}{z_i}. \quad (9)$$

Taking this intersection is what implicitly eliminates fallible data from $A^I$ and $b^I$. It is this operation that allows us to get a sharper bound on the set of solutions to the original system (2) than might otherwise be obtained.

If the original system contains at least one consistent set of equations, the intersection in (9) must not be empty. Knowing $x_n$ we can backsolve (6) for $x_{n-1}, \ldots, x_1$. From (6), this takes the standard form of backsolving a triangular system $T'x=u'$. Sharpening $x_n$ using (9) also produces sharper bounds $x'$ on the other components of x when we backsolve.

Inconsistency

Now suppose the initial equations (2) are not consistent. Then the equations (7) might or might not be consistent: Widening of intervals due to dependence and roundoff can cause the intersection in (9) to be non-empty.

Nevertheless, suppose we find that the intersection in (9) is empty. This event proves that the original equations (2) are inconsistent. Proving inconsistency might be the signal that a theory is measurably false, which might be an extremely enlightening event. On the other hand, inconsistency might only mean that invalid measurements have been made.

If invalid measurements are suspected, it might be important to discover which equation (s) in (2) are inconsistent. We might know which equation (s) in the transformed system (6) must be eliminated to obtain consistency. However, an equation in (6) is generally a linear combination of all the original equations in (2). Therefore, to establish consistency in the original system, we generally cannot determine which of its equation (s) to remove.

We might be able to determine a likely removal candidate by using the following steps:
1. Remove enough equations from (6) that the intersection in (9) is not empty.
2. Solve (6) for $x_{n-1}, \ldots, x_1$. This process cannot fail because we assume the elimination process to obtain (6) does not fail.
3. Substitute the solution into the original system (2). Any equation (s) in (2) whose left and right members do not intersect can be discarded.

Summary of the Gaussian Elimination Operation

Figure 6:
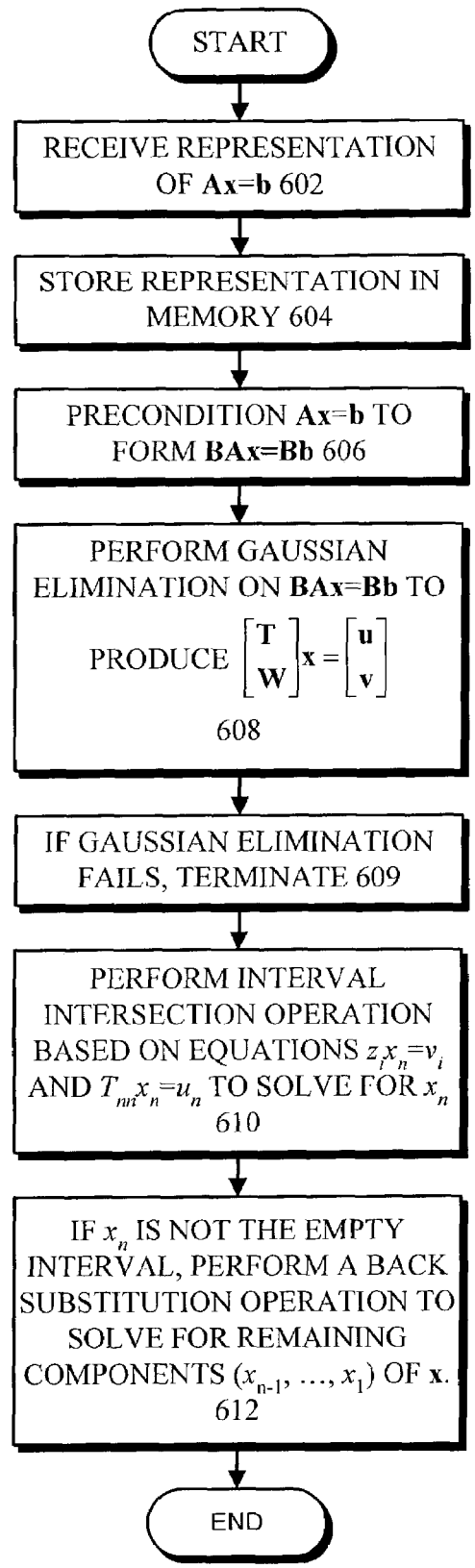
FIG. 6 illustrates the process of performing a Gaussian Elimination operation on an overdetermined interval system of linear equations in accordance with an embodiment of the present invention.

FIG. 6 illustrates the process of performing a Gaussian Elimination operation on an overdetermined interval system of linear equations in accordance with an embodiment of the present invention. The system starts by receiving a representation of the overdetermined system of linear equations Ax=b (step 602). In this representation, A is a matrix with m rows corresponding to m equations and n columns corresponding to n variables, x includes n variable components, b includes m scalar components, and m>n. The system then stores this representation in memory (step 604).

Next, the system preconditions Ax=b to generate a modified system BAx=Bb that can be solved with reduced interval width (step 606). This preconditioning process is described in more detail below with reference to FIG. 7.

The system then performs a Gaussian elimination operation on BAx=Bb to form $$\begin{bmatrix} T \\ W \end{bmatrix} x = \begin{bmatrix} u \\ v \end{bmatrix},$$

wherein T is a square upper triangular matrix of order n, u is an interval vector with n components, v is an interval vector with m−n components, and W is a matrix with m−n rows and n columns, and wherein W is zero except in the last column, which is represented as a column vector z with m−n components (step 608).

Note that Gaussian elimination can fail. If so, the system simply terminates (step 609).

If Gaussian elimination does not fail, the system performs an interval intersection operation based on the equations $z_i x_n = v_i$ (i=1, ..., m−n) and $T_{nn} x_n = u_n$ to solve for $$X_n = \frac{u_n}{T_{nn}} \bigcap_{i=1}^{m-n} \frac{v_i}{z_i}$$

(step 610).

Finally, if $x_n$ is not the empty interval, the system performs a back substitution operation using $x_n$ and Tx=u to solve for the remaining components $(x_{n-1}, \ldots, x_1)$ of x (step 612).

Figure 7:
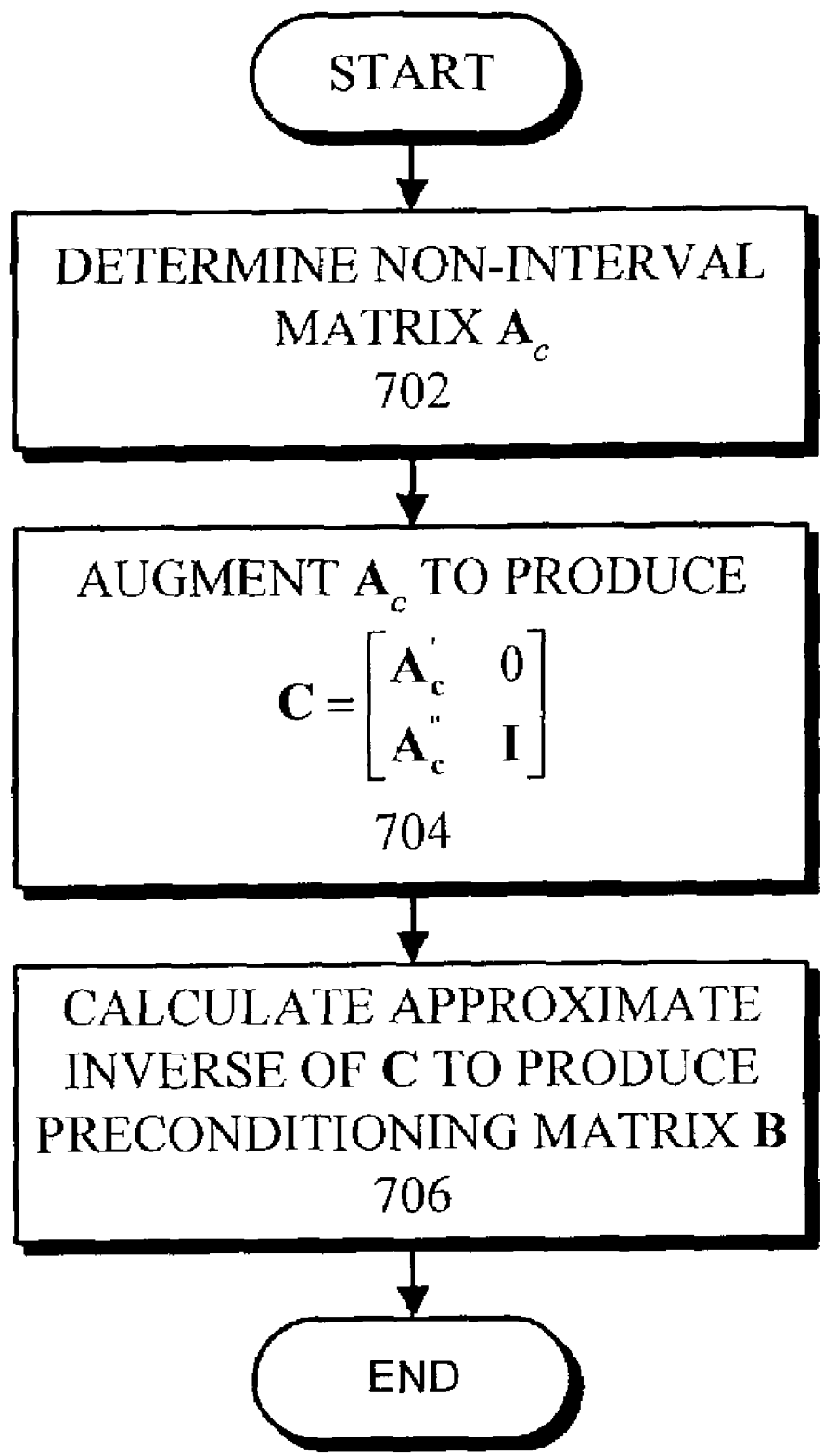
FIG. 7 illustrates the process of generating a preconditioning matrix in accordance with an embodiment of the present invention.

FIG. 7 illustrates the process of generating a preconditioning matrix in accordance with an embodiment of the present invention. The system starts by determining a non-interval matrix $A_c$, which is the approximate center of the interval matrix A (step 702). Next, the system augments the m×n matrix $A_c$ to produce an n×n partitioned matrix $$C = \begin{bmatrix} A_c' & 0 \\ A_c'' & I \end{bmatrix},$$

wherein $A_c'$ is an n×n matrix, $A_c''$ is an m−n×n matrix, I is the identity matrix of order m−n, and 0 is an n×m−n matrix of zeros (step 704). Finally, the system calculates the approximate inverse of the partitioned matrix C to produce the preconditioning matrix B (step 706). If C happens to be singular, its elements can be perturbed until it is no longer so. This causes no difficulty because C is just used to compute the approximate inverse B.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage device storing instructions that when executed by a computer cause the computer to perform a method for solving an overdetermined system of interval linear equations within a computer system, wherein the computer-readable storage device does not include computer instruction signals embodied in a transmission medium, and wherein the method comprises:

receiving a representation of the overdetermined system of interval linear equations Ax=b, wherein A is a matrix with m rows corresponding to m equations, and n columns corresponding to n variables, wherein x includes n variable components, b includes m scalar components, and m>n;

storing the representation in a memory within the computer system;

performing a Gaussian Elimination operation to transform Ax=b into the form $$\begin{bmatrix} T \\ W \end{bmatrix} x = \begin{bmatrix} u \\ v \end{bmatrix},$$

thereby facilitating arithmetic operations in the computer;

wherein T is a square upper triangular matrix of order n, u is an interval vector with n components, v is an interval vector with m−n components, and W is a matrix with m−n rows and n columns;

wherein W is zero except in the last column, which is represented as a column vector z with m−n components;

performing an interval intersection operation based on the equations $z_i x_n = v_i$ (i=1, ..., m−n) and $T_{nn} x_n = u_n$ to solve for $$x_n = \frac{u_n}{T_{nn}} \bigcap_{i=1}^{m-n} \frac{v_i}{z_i},$$

which are bounds for an unknown solution of $x_n$;

if $x_n$ is not the empty interval, performing a back substitution operation using $x_n$ and Tx=u to solve for the remaining components $(x_{n-1}, \ldots, x_1)$ of x;

using the components of x to determine the accuracy of a computation performed in an arithmetic unit.

2. The computer-readable storage device of claim 1, wherein before performing the Gaussian Elimination operation, the method further comprises using a preconditioning matrix B to precondition the system of interval linear equations Ax=b to generate a modified system BAx=Bb that can be solved with reduced interval width.

3. The computer-readable storage device of claim 2, wherein the method further comprises generating the preconditioning matrix B by:

determining a non-interval matrix $A_c$, which is the approximate center of the interval matrix A;

augmenting the m by n matrix $A_c$ to produce an n by n partitioned matrix $$C = \begin{bmatrix} A'_c & 0 \\ A''_c & I \end{bmatrix},$$

wherein $A_c'$ is an n by n matrix, $A_c''$ is an m−n by n matrix, I is the identity matrix of order m−n, and 0 is an n by m−n matrix of zeros; and calculating the approximate inverse of the partitioned matrix C to produce the preconditioning matrix B.

4. The computer-readable storage device of claim 1, wherein receiving Ax=b involves linearizing an initial system of nonlinear equations to form the system of interval linear equations Ax=b.

5. The computer-readable storage device of claim 1, wherein performing the Gaussian Elimination operation involves performing column interchanges in the system of interval linear equations Ax=b.

6. The computer-readable storage device of claim 1, wherein if $x_n$ is determined to be the empty interval during the interval intersection operation, the method further comprises concluding that the overdetermined system of interval linear equations Ax=b is inconsistent.

7. The computer-readable storage device of claim 6, wherein if Ax=b is determined to be inconsistent, the method further comprises:

selecting equations to remove from Ax=b to make a resulting system of equations consistent; and removing the selected equations.

8. The computer-readable storage device of claim 7, wherein if Ax=b is determined to be inconsistent, the method further comprises determining that at least one of the following is true:

an theory underlying Ax=b is false;

an error model underlying Ax=b is false; and measurement error was involved in generating Ax=b.

\* \* \* \* \*